US010654233B2

(12) United States Patent
Haitsma et al.

(10) Patent No.: US 10,654,233 B2
(45) Date of Patent: May 19, 2020

(54) TRANSFER DEVICE AND METHOD FOR TRANSFERRING A TIRE COMPONENT

(71) Applicant: VMI HOLLAND B.V., Epe (NL)

(72) Inventors: Otte Haitsma, Epe (NL); Jeroen Van Tienhoven, Epe (NL); Peter Rutgers, Epe (NL)

(73) Assignee: VMI HOLLAND B.V. (NL)

( * ) Notice: Subject to any disclaimer, the term of this patent is extended or adjusted under 35 U.S.C. 154(b) by 0 days.

(21) Appl. No.: 16/486,274

(22) PCT Filed: Jan. 23, 2018

(86) PCT No.: PCT/NL2018/050045
§ 371 (c)(1),
(2) Date: Aug. 15, 2019

(87) PCT Pub. No.: WO2018/151591
PCT Pub. Date: Aug. 23, 2018

(65) Prior Publication Data
US 2019/0375175 A1    Dec. 12, 2019

(30) Foreign Application Priority Data

Feb. 15, 2017    (NL) .................................... 2018380

(51) Int. Cl.
*B29D 30/00*        (2006.01)
*B65G 47/92*        (2006.01)
*B29D 30/44*        (2006.01)

(52) U.S. Cl.
CPC ......... *B29D 30/0016* (2013.01); *B65G 47/92* (2013.01); *B29D 2030/0038* (2013.01); *B29D 2030/4481* (2013.01)

(58) Field of Classification Search
CPC ........ B29D 30/00; B29D 30/06; B29D 30/08; B29D 30/0016; B29D 30/0022;
(Continued)

(56) References Cited

U.S. PATENT DOCUMENTS 3,584,868 A  *  6/1971  Fromm, Jr. .............. B23Q 7/00
                                                        271/84
3,709,385 A  *  1/1973  Klapes ................... B65G 47/92
                                                        414/294
(Continued)

FOREIGN PATENT DOCUMENTS

CN          104249467        12/2014
JP          58-55235         4/1983    .............. B29H 3/00
(Continued)

OTHER PUBLICATIONS

Decision to Grant issued in corresponding Japanese Patent Appln. Serial No. 2018-531570 dated Sep. 25, 2019 (with translation), 5 pgs.
(Continued)

*Primary Examiner* — Tyrone V Hall, Jr.
(74) *Attorney, Agent, or Firm* — Hayes Soloway PC

(57) ABSTRACT

A transfer device includes first and second transfer members which are movable into a first transfer state on opposite sides of a first transfer plane (P1). The first transfer member includes first magnetic field sources that form a first magnetic field array for retaining the tire component with a first magnetic attraction force (F1), while the second transfer member includes second magnetic field sources that form a second magnetic field array for retaining the tire component with a second magnetic attraction force (F2) that is larger than the first magnetic attraction force (F1) at the first transfer plane (P1), wherein in the first transfer state the second magnetic field array is offset with respect to the first magnetic field array.

37 Claims, 14 Drawing Sheets

(58) Field of Classification Search
CPC ... B29D 30/0027; B25B 11/002; B65G 47/92; B23Q 7/005; B23Q 7/14–1494; B25J 15/06; B25J 15/0608
See application file for complete search history.

(56) References Cited

U.S. PATENT DOCUMENTS

| | | | | |
|---|---|---|---|---|
| 4,372,538 A | * | 2/1983 | Balfanz | B23K 7/002 198/468.5 |
| 4,411,724 A | | 10/1983 | Ito et al. | 156/304.1 |
| 4,504,337 A | | 3/1985 | Askam et al. | 156/64 |
| 4,648,167 A | * | 3/1987 | Horvath | B23K 37/047 29/407.1 |
| 6,695,949 B1 | | 2/2004 | Jungk et al. | B29D 30/38 |
| 6,746,063 B1 | * | 6/2004 | Sanchez | B21D 43/24 271/18.1 |
| 8,985,936 B2 | | 3/2015 | Rankin et al. | B65G 49/00 |
| 10,350,847 B2 | | 7/2019 | Nakatani et al. | B29D 30/28 |
| 2011/0315516 A1 | | 12/2011 | Ravat et al. | 198/606 |
| 2012/0067516 A1 | | 3/2012 | Druet et al. | 156/250 |
| 2014/0277721 A1 | * | 9/2014 | Tomo | B25J 15/06 700/253 |

FOREIGN PATENT DOCUMENTS

| | | | | |
|---|---|---|---|---|
| JP | 59-212239 | | 12/1984 | B29H 17/28 |
| JP | 2003-507211 A | | 8/1999 | B29D 30/3007 |
| JP | 2012-506785 | | 3/2012 | B29D 30/08 |
| JP | 2012-511449 | | 5/2012 | B29D 30/38 |

OTHER PUBLICATIONS

International Search Report and Written Opinion issued in application No. PCT/NL2018/050045, dated Mar. 6, 2018 (10 pgs).

Decision to Grant in related Japanese Appln. No. 2018-531570, with translation.

Chinese Official Action issued in related Chinese Patent Application Serial No. 201880021335.8, dated Feb. 25, 2020 with translation (12 pgs).

* cited by examiner

TRANSFER DEVICE AND METHOD FOR TRANSFERRING A TIRE COMPONENT

BACKGROUND

The invention relates to a transfer device and a method for transferring a tire component.

U.S. Pat. No. 4,411,724 A discloses an apparatus for splicing cord ply segments. The apparatus is provided with a first retaining member that is constituted by a first electromagnet extending longitudinally of and within the first conveyor, and a second retaining member that is constituted by a second electromagnet extending longitudinally of and within the second conveyor. The electromagnet in the second conveyor is larger in magnetic force than the electromagnet in the first conveyor to the extent that the cord ply segments are able to be transferred from the first conveyor to the second conveyor. The transfer means is constituted by portions of the first and second electromagnets which are overlapped to each other.

While the difference in magnetic force between the electromagnets allows the transfer from the first conveyor to the second conveyor, the electromagnets themselves remain strongly magnetically attracted to each other. Hence, when the conveyors need to be separated from each other, e.g. to move the transferred cord ply segments to another position within the apparatus, said movement may be counteracted by the magnetic force. This is why U.S. Pat. No. 4,411,724 A features complex and expensive electromagnets to transfer the cord ply segments, so that one of said electromagnets can be switched off to allow separation from the other electromagnet.

It is an object of the present invention to provide a transfer device and a method for transferring a tire component, wherein the complexity and/or cost of the transfer device can be reduced.

SUMMARY OF THE INVENTION

According to a first aspect, the invention provides a transfer device for transferring an at least partially ferromagnetic tire component, wherein transfer device comprises a first transfer member and a second transfer member which are movable relative to each other into a first transfer state on opposite sides of a first transfer plane, wherein the first transfer member comprises a plurality of first magnetic field sources that form a first magnetic field array for retaining the tire component to the first transfer member with a first magnetic attraction force, wherein the second transfer member comprises a plurality of second magnetic field sources that form a second magnetic field array for retaining the tire component to the second transfer member with a second magnetic attraction force, wherein in the first transfer state the second magnetic attraction force at the first transfer plane is larger than the first magnetic attraction force at the first transfer plane to transfer the tire component from the first transfer member to the second transfer member, wherein in the first transfer state the second magnetic field array is at least partially offset with respect to the first magnetic field array.

Because of the offset, the magnetic attraction force between the first transfer member and the second transfer member can be reduced significantly, thus allowing for an easy separation of the transfer members after the transfer, without the need for additional separation means or control of the magnetic attraction forces.

In a preferred embodiment the first transfer member and the second transfer member are movable relative to each other from a pre-transfer state in which the first transfer member and the second transfer member are spaced apart from each other on opposite sides of the first transfer plane at a first mutual distance to the first transfer state in which the first transfer member and the second transfer member are spaced apart from each other on opposite sides of the first transfer plane at a second mutual distance that is smaller than the first mutual distance, and from the first transfer state into a post-transfer state in which the first transfer member and the second transfer member are spaced apart from each other on opposite sides of the first transfer plane at a third mutual distance that is larger than the second mutual distance, wherein the second magnetic field array is at least partially offset with respect to the first magnetic field array in the pre-transfer state, the first transfer state, the post-transfer state and therein between. Hence, the magnetic attraction force between the transfer members can be reduced significantly during both the approach of the transfer members from the pre-transfer state to the first transfer state as well as during the separation of the transfer members from the first transfer state to the post-transfer state.

In a further embodiment, in the first transfer state, the second magnetic field array is offset with respect to the first magnetic field array over a first offset angle about a first offset axis normal to the first transfer plane. Providing an offset about said first offset axis can be a simple yet effective way of misaligning the magnetic fields in the respective arrays.

In an embodiment thereof the first offset angle is chosen within a range of ten to eighty degrees, preferably within a range of twenty to seventy degrees and most preferably within a range of thirty to sixty degrees. Within said range, the magnetic attraction force between the transfer members can be reduced significantly.

In a further embodiment the first magnetic field sources are arranged in the first magnetic field array in one or more rows parallel to a first pattern direction.

In an embodiment thereof the first magnetic field sources are arranged in the first magnetic field array in one or more columns parallel to a second pattern direction transverse or perpendicular to the first pattern direction.

In a further embodiment thereof the second magnetic field sources are arranged in the second magnetic field array in one or more rows parallel to a third pattern direction.

In an embodiment thereof the second magnetic field sources are arranged in the second magnetic field array in one or more columns parallel to a fourth pattern direction transverse or perpendicular to the third pattern direction.

Hence, the magnetic field sources can be provided in a predetermined pattern to allow for better control of the offset and its effect on the magnetic attraction force between the transfer members.

Preferably, the first pattern direction is different from the third pattern direction. Hence, at least some of the first magnetic field sources in said first pattern direction can be offset with respect to at least some of the second magnetic field sources in the third pattern direction.

Preferably, the second pattern direction is different from the fourth pattern direction. Hence, at least some of the first magnetic field sources in said second pattern direction can be offset with respect to at least some of the second magnetic field sources in the fourth pattern direction.

Preferably, the first magnetic field sources in each row of the first magnetic field array are evenly distributed in the first pattern direction at a first pitch distance.

Preferably, the first magnetic field sources in each column of the first magnetic field array are evenly distributed in the second pattern direction at a second pitch distance.

Preferably, the second magnetic field sources in each row of the second magnetic field array are evenly distributed in the third pattern direction at a third pitch distance.

Preferably, the second magnetic field sources in each column of the second magnetic field array are evenly distributed in the fourth pattern direction at a fourth pitch distance.

By providing the magnetic field sources at a predetermined pitch, the offset and its effect on the magnetic attraction force between the transfer members can be controlled more accurately.

In one embodiment the first pitch distance and the third pitch distance are unequal.

In another embodiment the second pitch distance and the fourth pitch distance are unequal.

The unequal pitch can provide an offset between at least some of the first magnetic field sources with respect to the second magnetic field sources.

Alternatively, the first magnetic field sources are arranged in the first magnetic field array according to a first random pattern. Preferably, the second magnetic field sources are arranged in the second magnetic field array according to a second random pattern different from the first random pattern. It has been found that different random patterns can also provide a considerable reduction in the magnetic attraction force between the transfer members.

In a further embodiment the plurality of first magnetic field sources comprises a first group of magnets that face towards the first transfer plane with a north magnetic polarity and a second group of magnets that face towards the first transfer plane with a south magnetic polarity. By providing different polarities, at least some of the first magnetic field sources may repel the second magnetic field sources of the same polarity.

In an embodiment thereof the plurality of second magnetic field sources comprises a first group of magnets that face towards the first transfer plane with a north magnetic polarity and a second group of magnets that face towards the first transfer plane with a south magnetic polarity. By providing different polarities, at least some of the second magnetic field sources may repel the first magnetic field sources of the same polarity.

In a further embodiment thereof the magnets of the first group alternate with the magnets of the second group within a respective one of the magnetic field arrays. The alternation provides for an at least partially repelling magnet array.

Preferably, the first mutual distance and the third mutual distance are at least five millimeters and most preferably at least ten millimeters. Hence, within said minimum mutual distance range, the offset is provided between the respective arrays.

In an embodiment the transfer device further comprises at least one drive member for driving the relative movement of the first transfer member and the second transfer member between the pre-transfer state, the first transfer state and the post-transfer state.

In an embodiment thereof the transfer device further comprises a control unit that is arranged for controlling the at least one drive member for driving the relative movement of the first transfer member and the second transfer member between the pre-transfer state, the first transfer state and the post-transfer state.

Preferably, the first magnetic field sources, the second magnetic field sources or both are permanent magnets. Permanent magnets are less expensive and less complex than controllable electromagnets.

In an embodiment the transfer device further comprising a third transfer member, wherein the second transfer member and the third transfer member are movable relative to each other into a second transfer state on opposite sides of a second transfer plane, wherein the third transfer member comprises a plurality of third magnetic field sources that form a third magnetic field array for retaining the tire component to the third transfer member with a third magnetic attraction force, wherein in the second transfer state the third magnetic attraction force at the second transfer plane is larger than the second magnetic attraction force at the second transfer plane to transfer the tire component from the second transfer member to the third transfer member, wherein in the second transfer state the third magnetic field array is at least partially offset with respect to the second magnetic field array. The third transfer member can interact with the second transfer member in substantially the same manner as the second transfer member with the first transfer member and can be used to transfer the tire component further. In a preferred embodiment thereof in the second transfer state the third magnetic field array is offset with respect to the second magnetic field array over a second offset angle about a second offset axis normal to the second transfer plane.

In a further preferred embodiment thereof the second offset angle is chosen within a range of ten to eighty degrees, preferably within a range of twenty to seventy degrees and most preferably within a range of thirty to sixty degrees.

In a further embodiment thereof the transfer device further comprises a fourth transfer member or further transfer members that together with the first transfer member, the second transfer member and the third transfer member forms a series of transfer members for consecutively transferring the tire component between successive or consecutive pairs of a delivering transfer member and a receiving transfer member within the series at respective transfer planes, wherein each one of the fourth transfer member or the further transfer members comprises a plurality of further magnets that forms a further magnet array for retaining the tire component to the one of the fourth transfer member or the further transfer members with a further magnetic attraction force, wherein for each successive or consecutive pair of transfer members the magnetic attraction force of the receiving transfer member is larger than the magnetic attraction of the delivering transfer member at the respective transfer plane to transfer the tire component from the delivering transfer member to the receiving transfer member, wherein for each successive or consecutive pair the magnetic field array of the receiving transfer member is at least partially offset with respect to the magnetic field array of the delivering transfer member. The fourth transfer member can interact with the third transfer member in substantially the same manner as the second transfer member with the first transfer member and can be used to transfer the tire component further.

In an embodiment thereof, for each pair successive or consecutive transfer members, the magnetic field array of each receiving transfer member is offset with respect to the magnetic field array of the delivering member over an offset angle about a respective offset axis normal to the respective transfer plane. Hence, for each pair, an offset angle can be provided that allows for easy separation of the transfer members within said pair.

Preferably, wherein the offset angle for each pair is at least ten degrees and preferably at least fifteen degrees. At said minimum offset angle, it has been found that the magnetic attraction force between the transfer members can be reduced considerably.

More preferably, the offset angle for each pair is equal to ninety degrees divided by the number of transfer members within the series. Hence, with a minimum angle of ten degrees, a maximum of eight pairs of transfer members can be used in series.

In a further embodiment thereof the last transfer member in the series of transfer members is the first transfer member of the same series of transfer members. The first transfer member can thus have multiple functions within the transfer device.

In another embodiment the magnetic attraction force of one of the magnetic field arrays is adjustable. This allows for reducing the magnetic attraction force of said one magnet array. The adjustability may for example be achieved by arranging one or more electromagnets in the respective magnet array. Said electromagnets can be controlled in a range from a maximum magnetic attraction force to zero magnetic attraction force. Using one or more electromagnets can also reduce the tendency of the tire component to jump from one transfer member to another transfer member prior to reaching the respective transfer state.

In an embodiment thereof one of the transfer members comprises a transfer body and a release mechanism that is arranged for moving the respective magnetic field array with respect to said transfer body away from the transfer plane. Said release mechanism can mechanically separate the magnetic field array, thereby reducing the strength of its magnetic field at the transfer plane.

According to a second aspect, the invention provides a method for transferring an at least partially ferromagnetic tire component with the use of a transfer device according to any one of the aforementioned embodiments, wherein the method comprises the steps of:

retaining the tire component to the first transfer member with the first magnetic attraction force;

moving the first transfer member and the second transfer member relative to each other into the first transfer state on opposite sides of the first transfer plane;

retaining the tire component to the second transfer member with the second magnetic attraction force, wherein in the first transfer state the second magnetic attraction force at the first transfer plane is larger than the first magnetic attraction force at the first transfer plane; and transferring the tire component from the first transfer member to the second transfer member, wherein in the first transfer state the second magnetic field array is at least partially offset with respect to the first magnetic field array.

This method relates to the implementation of the transfer device and thus has the same technical advantages as the aforementioned transfer device and its embodiments.

In a preferred embodiment the method further comprises the steps of:

moving the first transfer member and the second transfer member relative to each other from a pre-transfer state in which the first transfer member and the second transfer member are spaced apart from each other on opposite sides of the first transfer plane at a first mutual distance;

moving the first transfer member and the second transfer member relative to each other from the pre-transfer state into the first transfer state in which the first transfer member and the second transfer member are spaced apart from each other on opposite sides of the first transfer plane at a second mutual distance that is smaller than the first mutual distance; and moving the first transfer member and the second transfer member relative to each other from the first transfer state into a post-transfer state in which the first transfer member and the second transfer member are spaced apart from each other on opposite sides of the first transfer plane at a third mutual distance that is larger than the second mutual distance, wherein the second magnetic field array is at least partially offset with respect to the first magnetic field array in the pre-transfer state, the first transfer state, the post-transfer state and therein between.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
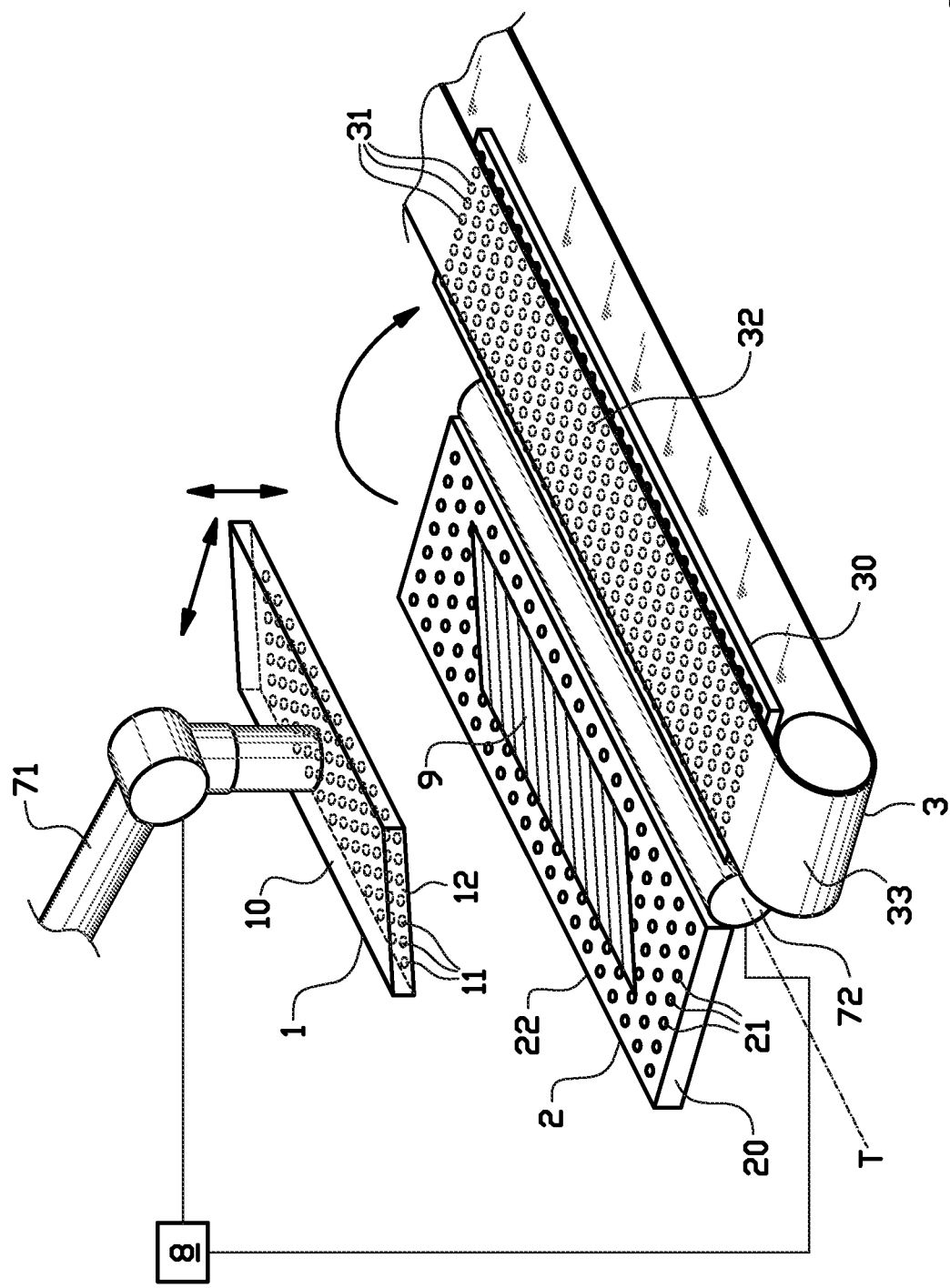
FIG. 1 shows an isometric view of a transfer device for transferring a tire component, comprising a first transfer member, a second transfer member and a third transfer member according to a first exemplary embodiment of the invention.

FIG. 1 shows a transfer device for transferring an at least partially ferromagnetic tire component 9 according to an exemplary embodiment of the invention. The tire component 9 typically comprises an elastomeric body with embedded ferromagnetic, metal or steel reinforcement cords.

The transfer device comprises a first transfer member 1, a second transfer member 2 and a third transfer member 3. The first transfer member 1 is mounted to the end of a first drive member 71, in this example a robotic manipulator or a robot arm. As such, the first transfer member 1 may be regarded as a gripper at the end of a robotic manipulator 71. In this exemplary embodiment, the shape or contour of the first transfer member 1 is adapted to match or substantially match the parallelogram shape of the tire component 9. The second transfer member 2 is coupled a second drive member 72 so as to be rotatable about a turn-table axis T. As such, the second transfer member 2 may be regarded as a turn-table for turning-over or flipping the tire component 9. The third transfer member 3 is placed directly underneath an endless belt of a belt conveyor 33. As such, the third transfer member 3 may be regarded as a functional component of said belt conveyor 33.

It will however be apparent to one skilled in the art that the transfer members 1, 2, 3 may be used in various alternative applications where an at least partially ferromagnetic tire component 9 requires transfer from one transfer member to the other transfer member. The description hereafter refers to the transfer of an at least partially ferromagnetic tire component 9 between generic transfer members 1, 2, 3, not limited to the application as shown in the exemplary drawings.

As shown in FIG. 1, the first transfer device 1 comprises a first transfer body 10 and a plurality of first magnetic field sources 11 mounted in or to said first transfer body 10 to form a first magnetic field matrix or array 12 for retaining the tire component 9 to the first transfer body 10 of the first transfer member 1 with a first magnetic attraction force F1. The second transfer device 2 comprises a second transfer body 20 and a plurality of second magnetic field sources 21 mounted in or to said second transfer body 20 to form a second magnetic field matrix or array 22 for retaining the tire component 9 to the second transfer body 20 of the second transfer member 2 with a second magnetic attraction force F2. The third transfer device 3 comprises a third transfer body 30 and a plurality of third magnetic field sources 31 mounted in or to said third transfer body 30 to form a third magnet matrix or array 32 for retaining the tire component 9 to the third transfer body 30 of the third transfer member 3 with a third magnetic attraction force F3. The first magnetic field sources 11, the second magnetic field sources 21 and/or the third magnetic field sources 31 may be individual magnets or integrated magnet bodies that generate individual magnetic fields.

Figure 2:
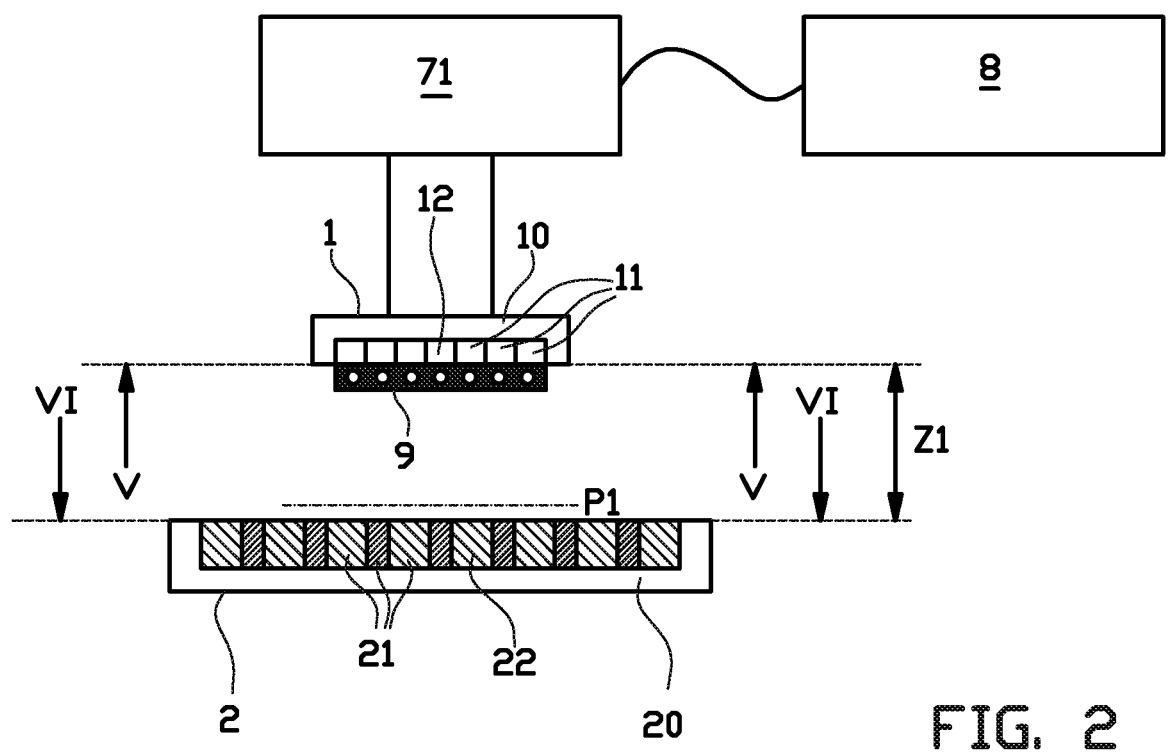
FIGS. 2, 3 and 4 show front views of the first transfer member and the second transfer member during exemplary steps of a method for transferring the tire component.
Figure 3:
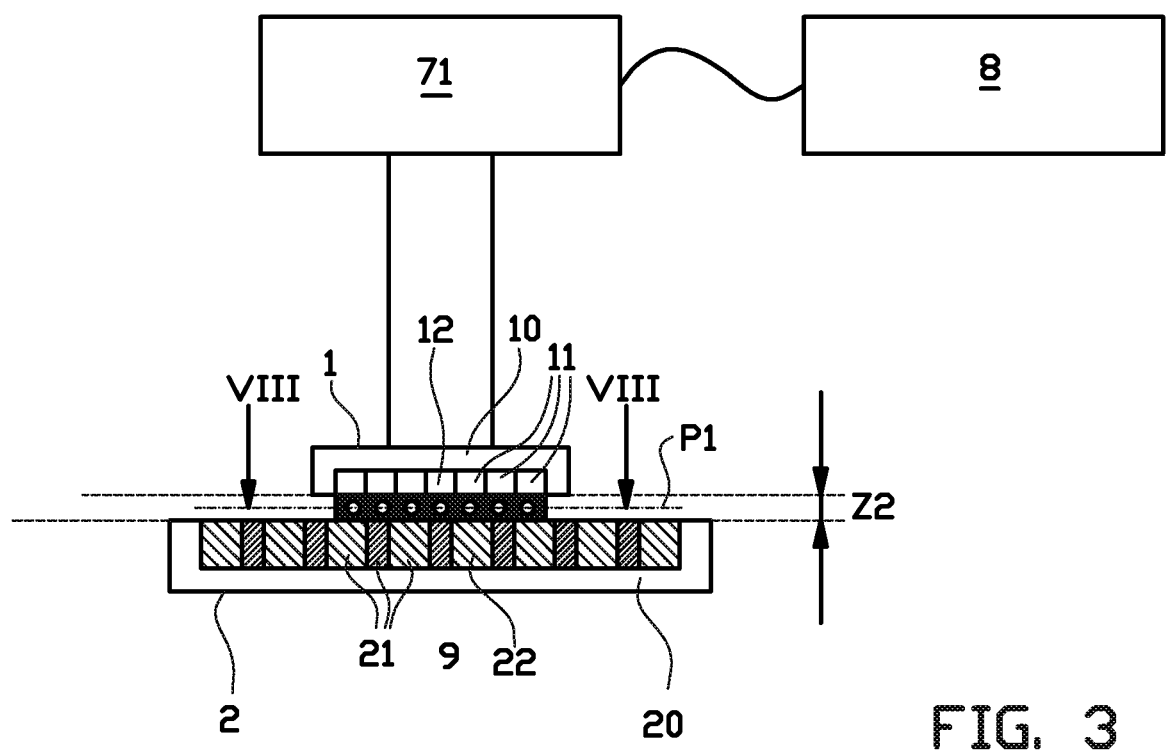
Figure 4:
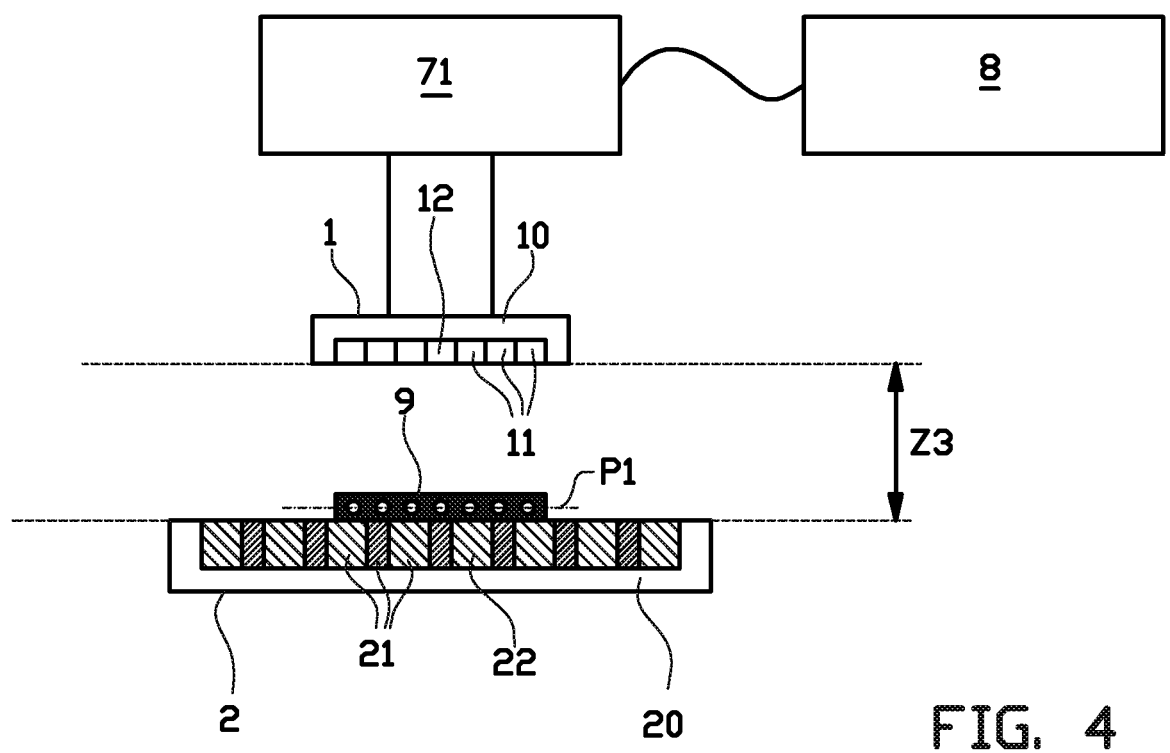

FIGS. 2-4 shows the steps of a method for transferring the tire component 9 from the first transfer member 1 to the second transfer member 2.

FIG. 2 shows that the first transfer member 1 and the second transfer member 2 are moved relative to each other into a pre-transfer state in which the first transfer member 1 and the second transfer member 2 are spaced apart from each other on opposite sides of the first transfer plane P1. In said pre-transfer state, the first transfer member 1 and the second transfer member 2 are spaced apart at a first mutual distance Z1.

FIG. 3 shows that the first transfer member 1 and the second transfer member 2 are subsequently moved relative to each other from the pre-transfer state, as shown in FIG. 2, into a first transfer state in which the first transfer member 1 and the second transfer member 2 are spaced apart from each other on opposite sides of the first transfer plane P1 at a second mutual distance Z2 that is smaller than the first mutual distance Z1. In particular, the second mutual distance Z2 is chosen to be substantially equal to the thickness of the tire component 9 so that both the first transfer member 1 and the second transfer member 2 may be arranged in abutting contact with the tire component 9 at opposite sides of the first transfer plane P1. Hence, the tire component 9 can be transferred from the first transfer member 1 to the second transfer member 2 without letting go of said tire component 9. In this exemplary embodiment, the first transfer member 1 and the second transfer member 2 are moved relative to each other by moving the first transfer member 1 with the use of the first drive member 71 towards the second transfer member 2. Preferably, the first transfer member 1 and the second transfer member 2 are movable relative to each other in a direction normal and/or perpendicular to the first transfer plane P1.

FIG. 4 shows that the first transfer member 1 and the second transfer member 2 are subsequently moved relative to each other from the first transfer state, as shown in FIG. 3, into a post-transfer state in which the first transfer member 1 and the second transfer member 2 are spaced apart from each other on opposite sides of the first transfer plane P1 at a third mutual distance Z3 that is larger than the second mutual distance Z2.

The second magnetic attraction force F2 is larger than the first magnetic attraction force F1 to ensure that the tire component 9 is actually transferred from the first transfer member 1 to the second transfer member 2 when the first transfer member 1 and the second transfer member 2 move from the first transfer state into the post-transfer state.

When the first transfer member 1 and the second transfer member 2 are positioned in the first transfer state at opposite sides of the first transfer plane P1, as in FIG. 3, the first magnetic field array 12 of the first transfer member 1 may be magnetically attracted to the second magnetic field array 22 of the second transfer member 2. This magnetic attraction between the respective transfer members 1, 2 could potentially counteract the relative movement of said transfer members 1, 2 apart from each other. Hence, to reduce and/or prevent magnetic attraction between the first transfer member 1 and the second transfer member 2 in the first transfer state, the second magnetic field array 22 is at least partially offset with respect to the first magnetic field array 12. 'Partially offset', in the context of the present invention, means that at least some of the first magnetic field sources 11 of the first magnetic field array 12 are misaligned and/or shifted, e.g. by rotation, translation or change in pitch distance, with respect to some of the second magnetic field sources 21 of the second magnetic field array 22. Hence, while the first transfer member 1 and the second transfer member 2 can individually magnetically attract the tire component 9 with the first magnetic attraction force F1 and the second magnetic attraction force F2, respectively, the magnetic attraction between the first transfer member 1 and the second transfer member 2 can be kept to a minimum. Thus, less effort is required to separate the first transfer member 1 and the second transfer member 2.

Preferably, the second magnetic field array 22 is at least partially offset with respect to the first magnetic field array 12 in the pre-transfer state, the first transfer state, the post-transfer state and therein between. Hence, both during the mutual approach as well as during the separation of the first transfer member 1 and the second transfer member 2, the magnetic attraction between the first transfer member 1 and the second transfer member 2 can be kept to a minimum. This prevents that the magnetic attraction negatively influences the accuracy of the positioning of the first transfer member 1 with respect to the second transfer member 2.

In the pre-transfer state of FIG. 2 and the post-transfer state of FIG. 4, the first mutual distance Z1 and the third mutual distance Z3 between the first transfer member 1 and the second transfer member 2 is at least five millimeters and more preferably at least ten millimeters. When moving the first transfer member 1 and the second transfer member 2 apart towards the upper end of said range, the magnetic attraction force between the first transfer member 1 and the second transfer member 2 is negligible. It is preferred to keep the first magnetic field array 12 and the second magnetic field array 22 at least partially misaligned when the first transfer member 1 and the second transfer member 2 are within said range.

Figure 5:
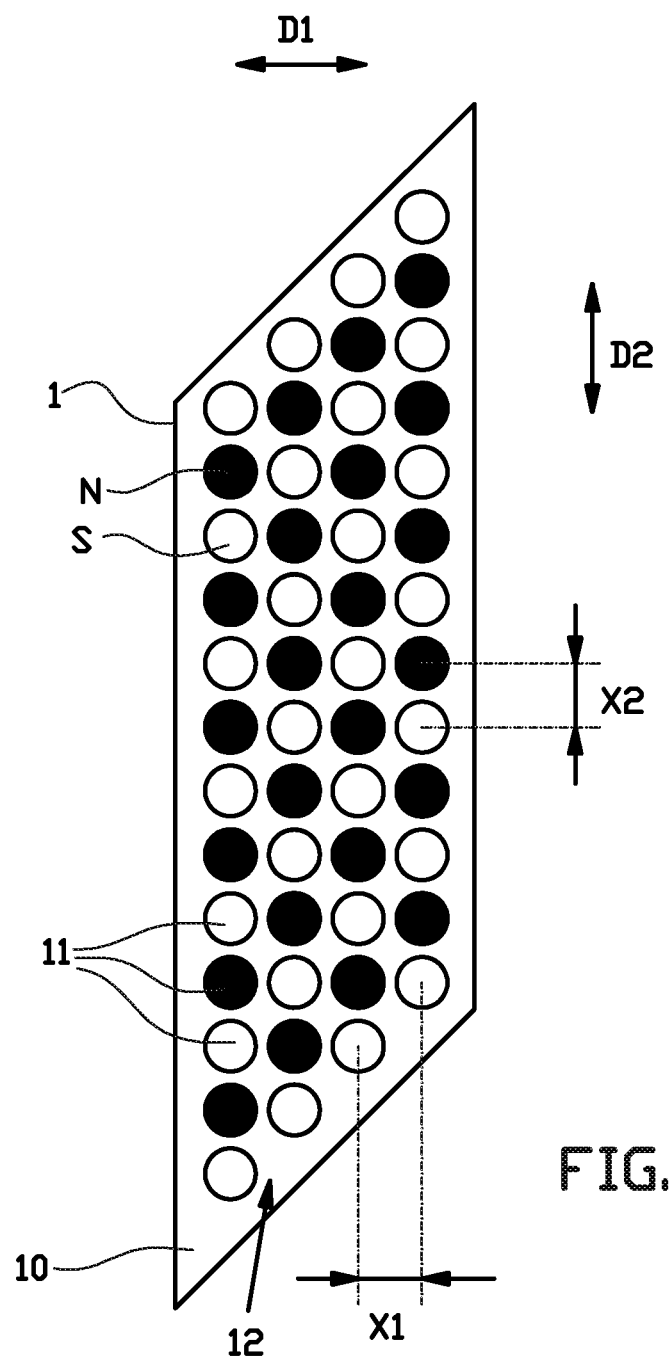
FIG. 5 shows a bottom view of the first transfer member along the line V-V in FIG. 2.

FIG. 5 shows an example of a possible configuration of the first magnetic field array 12. The first magnetic field sources 11 of said first magnetic field array 12 are arranged in mutually parallel rows and columns extending in a first pattern direction D1 and a second pattern direction D2, respectively. Preferably, the first magnetic field sources 11 in each row are evenly distributed in the first pattern direction D1 at a first pitch distance X1. Preferably, the first magnetic field sources 11 in each column are also evenly distributed in the second pattern direction D2 at a second pitch distance X2. 'Pitch distance', in the context of the present invention, means the center-to-center or heart distance between two directly adjacent first magnetic field sources in a respective row or column of the first magnetic field array 12. In this exemplary embodiment, the plurality of first magnetic field sources 11 comprises a first group of magnets that face towards the first transfer plane P1 with a north magnetic polarity N and a second group of magnets that face towards the first transfer plane P1 with a south magnetic polarity S. Preferably, the magnets of the first group alternate with the magnets of the second group.

Figure 6:
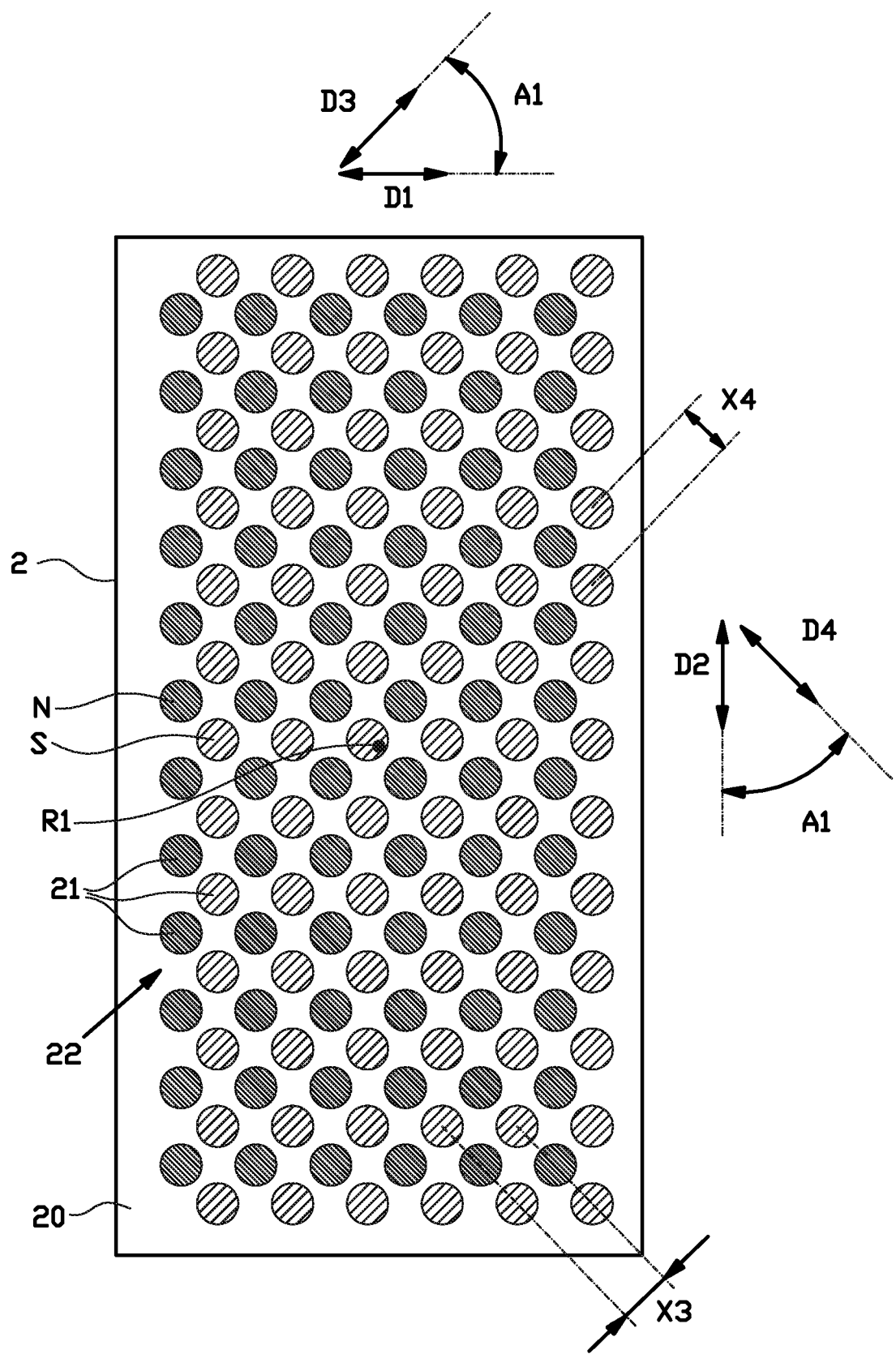
FIG. 6 shows a top view of the second transfer member along the line VI-VI in FIG. 2.

FIG. 6 shows an example of a possible configuration of the second magnetic field array 22. The second magnetic field sources 21 of said second magnetic field array 22 are arranged in mutually parallel rows and columns extending in a third pattern direction D3 and a fourth pattern direction D4, respectively. Preferably, the second magnetic field sources 21 in each row are evenly distributed in the third pattern direction D3 at a third pitch distance X3. Preferably, the second magnetic field sources 21 in each column are also evenly distributed in the fourth pattern direction D4 at a fourth pitch distance X4. 'Pitch distance', in the context of the present invention, means the center-to-center or heart distance between two directly adjacent second magnetic field sources in a respective row or column of the second magnetic field array 22. In this exemplary embodiment, the plurality of second magnetic field sources 21 comprises a first group of magnets that face towards the first transfer plane P1 with a north magnetic polarity N and a second group of magnets that face towards the first transfer plane P1 with a south magnetic polarity S. Preferably, the magnets of the first group alternate with the magnets of the second group.

Figure 7:
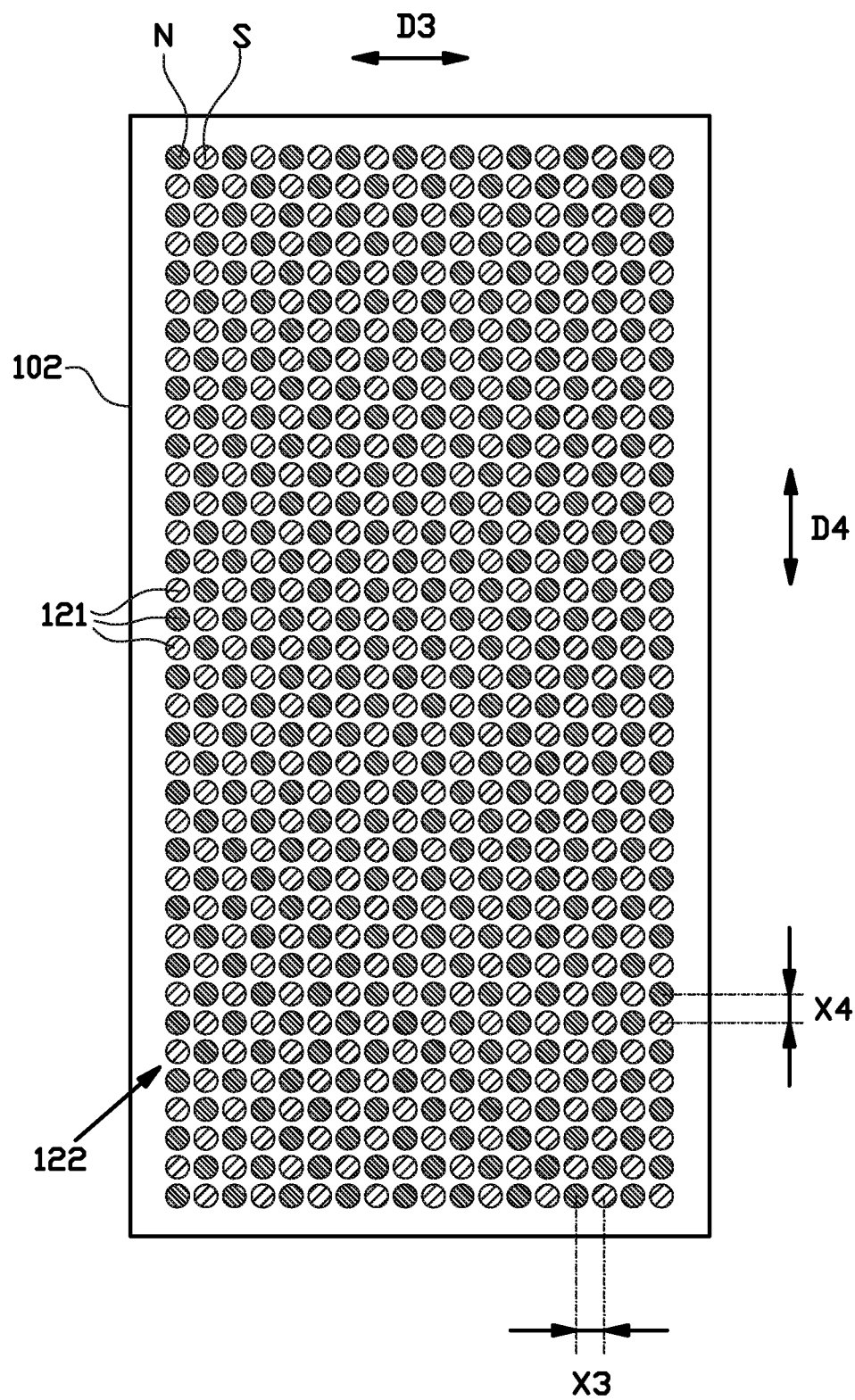
FIG. 7 shows a top view of an alternative second transfer member according to a second exemplary embodiment of the invention.

FIG. 7 shows an example of a possible alternative configuration of a second magnetic field array 122 of an alternative second transfer member 102. In said second magnetic field array 122, the second magnetic field sources 121 are again arranged in mutually parallel rows and columns extending in a third pattern direction D3 and a fourth pattern direction D4, respectively. The second magnetic field sources 121 in each row are evenly distributed in the third pattern direction D3 at an alternative third pitch distance X3 that is smaller than the first pitch distance X1. The second magnetic field sources 121 in each column are also evenly distributed in the fourth pattern direction D4 at an alternative fourth pitch distance X4 that is smaller than the second pitch distance X2. Preferably, the third pitch distance X3 and the fourth pitch distance X4 are at least two times smaller than the first pitch distance X1 and the second pitch distance X2, respectively.

Figure 8:
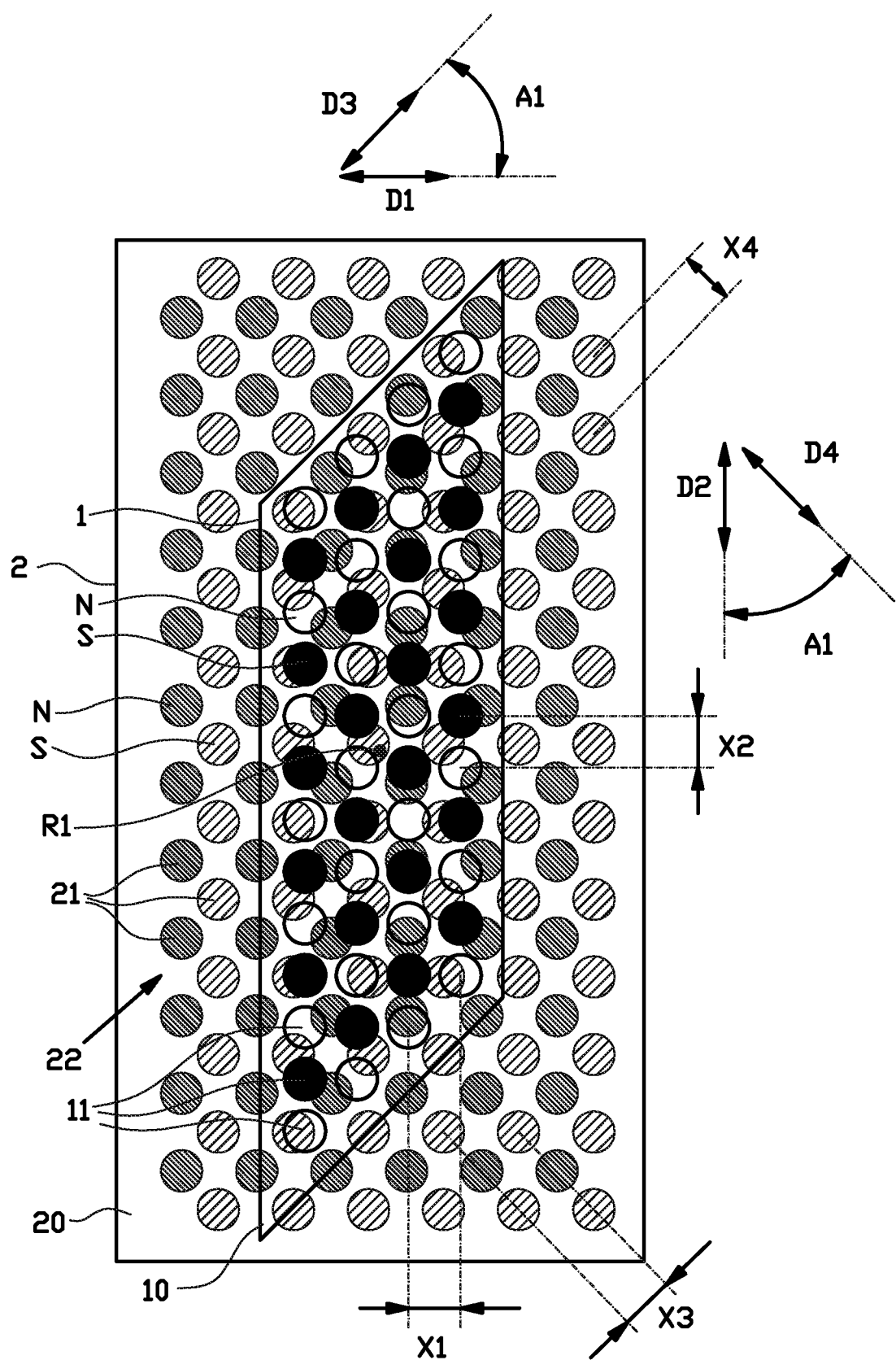
FIG. 8 shows an overlay of the bottom view of first transfer member with the bottom view of the second transfer member according to the line VIII-VIII in FIG. 3.

FIG. 8 shows an overlay of the first transfer member 1 according to FIG. 5 with the second transfer member 2 according to FIG. 6 in the first transfer position of FIG. 3. FIG. 8 clearly shows that the second magnetic field array 22 is offset with respect to the first magnetic field array 12 by rotation of said second magnetic field array 22 with respect to the first magnetic field array 12 over a first offset angle A1 about a first offset axis R1 normal and/or perpendicular to the first transfer plane P1. Consequently, the third pattern direction D3 is offset with respect to the first pattern direction D1 over the first offset angle A1 and the fourth pattern direction D4 is offset with respect to the second pattern direction D2 over the first offset angle A1. In this example, the first offset angle A1 is approximately forty-five (45) degrees. As clearly shown in FIG. 8, the first offset angle A1 causes a relative shift between the first magnetic field array 12 and the second magnetic field array 22 such that many of the first magnetic field sources 11 are misaligned with and/or only partially overlapped by the second magnetic field sources 21. This reduces the magnetic attraction between the first transfer member 1 and the second transfer member 2 to a minimum.

It has been found that a first offset angle A1 in the range of ten (10) to eighty (80) degrees is also possible to achieve a considerable reduction in the magnetic attraction between the first transfer member 1 and the second transfer member 2.

Figure 9:
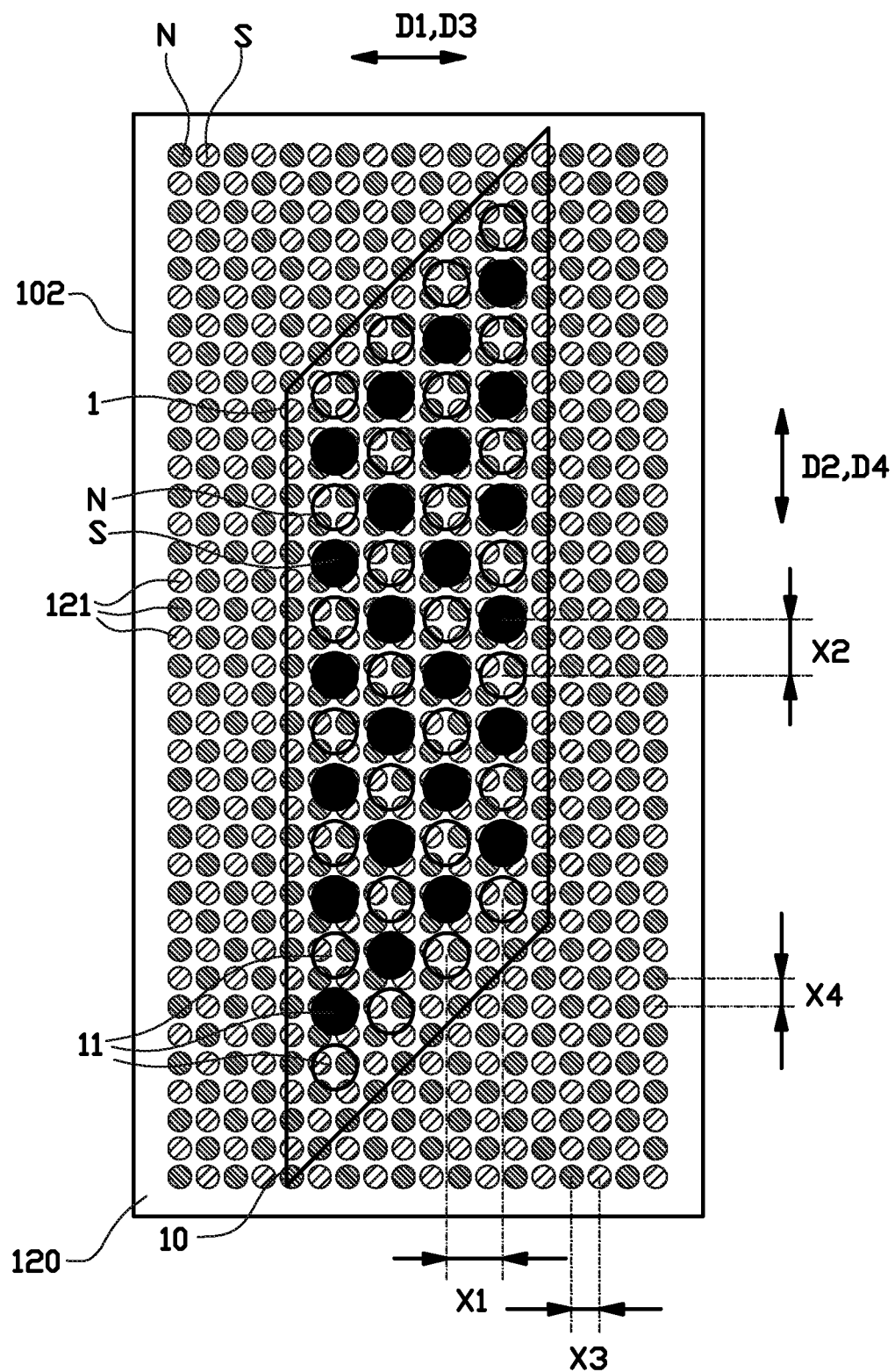
FIG. 9 shows an alternative overlay of the bottom view of the first transfer member according to FIG. 5 with the top view of the alternative second transfer member according to FIG. 7.

FIG. 9 shows an overlay of the first transfer member 1 according to FIG. 5 with the alternative second transfer member 102 according to FIG. 7 in the first transfer position of FIG. 3. FIG. 9 clearly shows that the second magnetic field array 122 is offset with respect to the first magnetic field array 12 by a mismatch of the first pitch distance X1 and the second pitch distance X2 with the third pitch distance X3 and the fourth pitch distance X4, respectively. In particular, for a substantial part of the overlay, one of the first magnetic field sources 11 overlaps with four of the second magnetic field sources 121. Of said four second magnetic field sources 121, at least two are of equal polarity than the polarity of the oppositely located first magnetic field source 11, thereby at least partially repelling said respective first magnetic field source 11. Hence, the magnetic attraction between the first transfer member 1 and the second transfer member 2 can be reduced significantly and could potentially be reduced towards zero.

FIGS. 10A-10I shows the steps of a more complex method for transferring the tire component 9 from the first transfer member 1 to the second transfer member 2, from the second transfer member 2 to the third transfer member 3 and from the third transfer member 3 to a fourth transfer member 4 or back to the first transfer member 1.

Figure 10A:
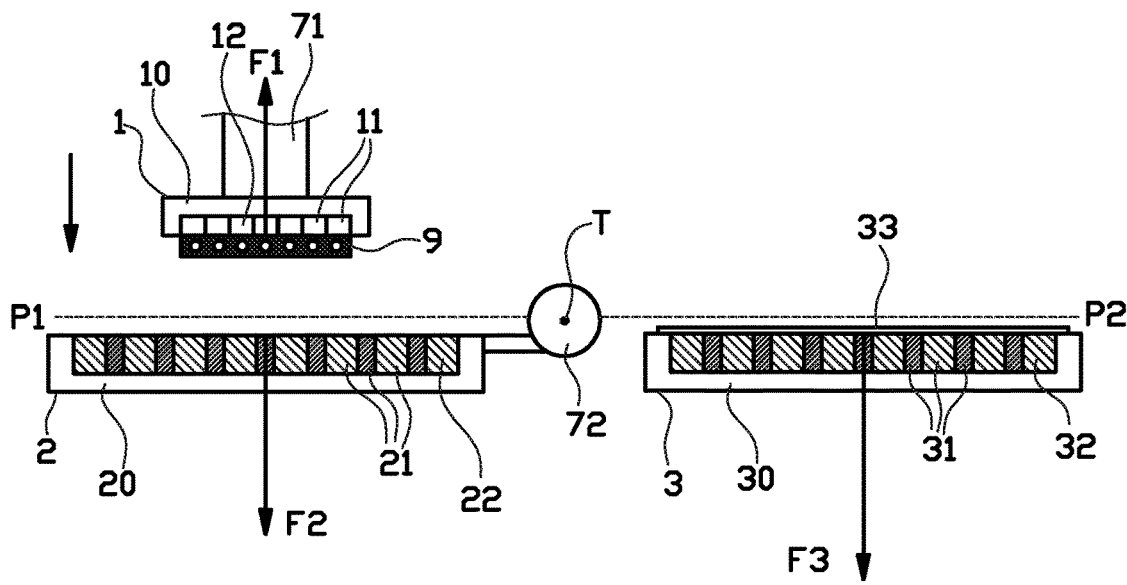
FIGS. 10A-10I show schematic front views of the first transfer member, the second transfer member and the third transfer member according to FIG. 1 during exemplary steps of the method for transferring the tire component.
Figure 10B:
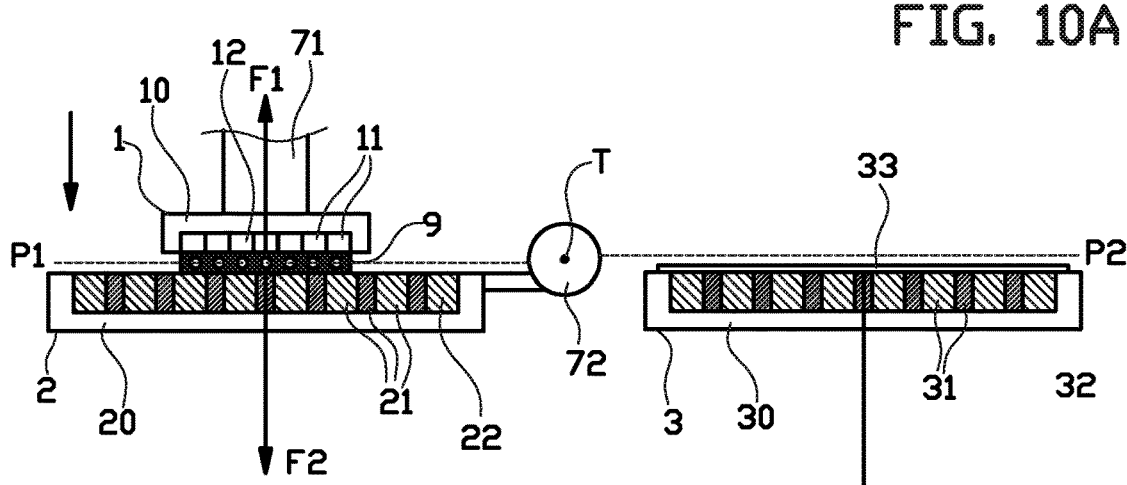
Figure 10C:
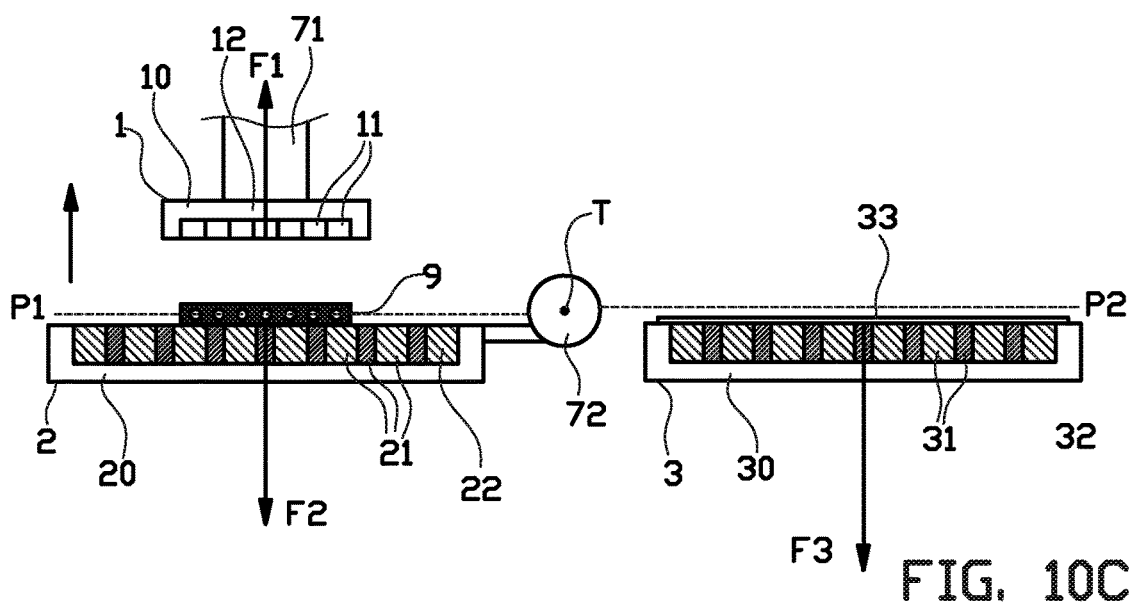
Figure 10D:
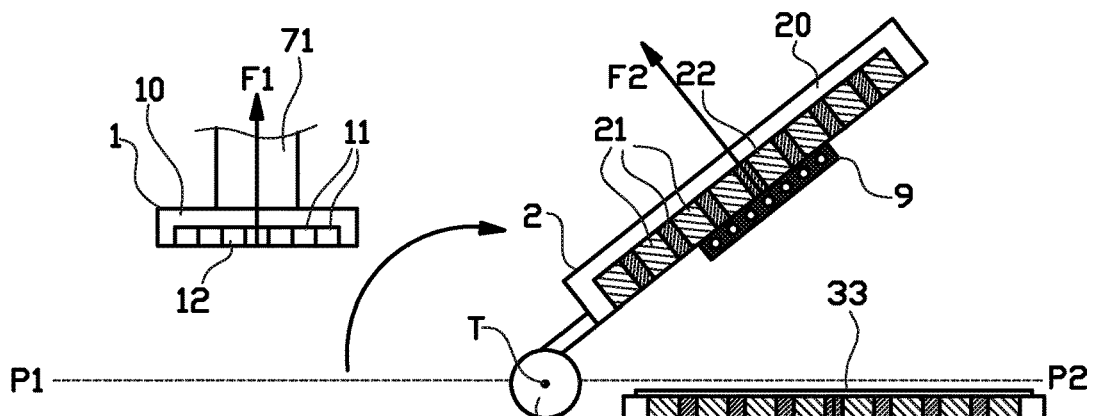

The steps as shown in FIGS. 10A-10C correspond to the steps of transferring the tire component 9 between the first transfer member 1 and the second transfer member 2, as shown in FIGS. 2-4. FIG. 10D shows the situation in which the second drive member 32 has been actuated to turn-over and/or flip the first transfer member 1 and the tire component 9 received thereon about the turn-table axis T from the first transfer plane P1 towards a second transfer plane P2 at the third transfer member 3. During the turning-over, the second magnetic field array 22 at the second transfer member 2 retains the tire component 9 to the second transfer member 2, even when the transfer member 2 is turned up-side-down with respect to the orientation as shown in FIG. 10C.

Figure 10E:
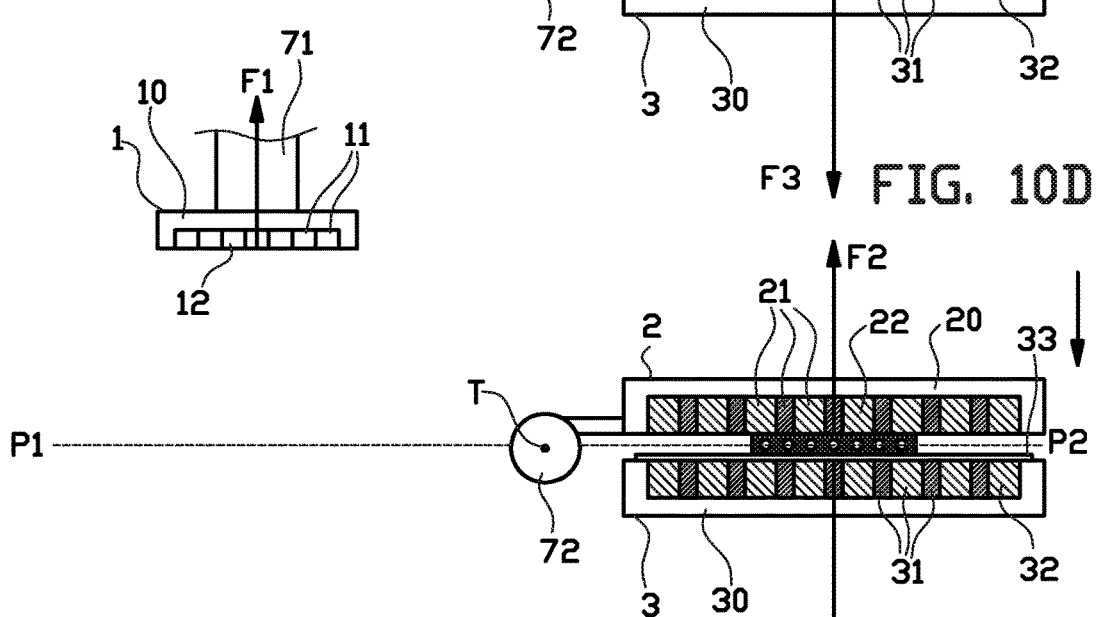

FIG. 10E shows the situation in which the second transfer member 2 has be turn-over fully into a position opposite to the third transfer member 3 with respect to the second transfer plane P2. This is referred to as the second transfer state, in which the third transfer member 3 are moved relative to each other into respective positions on opposite sides of the second transfer plane P2. Although the approach of the second transfer member 2 towards the third transfer member 3 is the result of a rotation about the turn-table axis T, it is noted that the very last part of said rotation, meaning the last few degrees of rotation and/or the last five to ten millimeters until its end position, can be considered as a substantially linear approach. Hence, the second transfer member 2 and the third transfer member 3 move through a pre-transfer state, the second transfer state and a post-transfer state in essentially the same manner as the first transfer member 1 and the second transfer member 2 with respect to the first transfer state.

In FIG. 10E, the third magnetic attraction force F3 is larger than the second magnetic attraction force F2 to ensure that the tire component 9 is actually transferred from the second transfer member 2 to the third transfer member 3 when the second transfer member 2 and the third transfer member 3 move from the second transfer state into the post-transfer state.

Figure 10F:
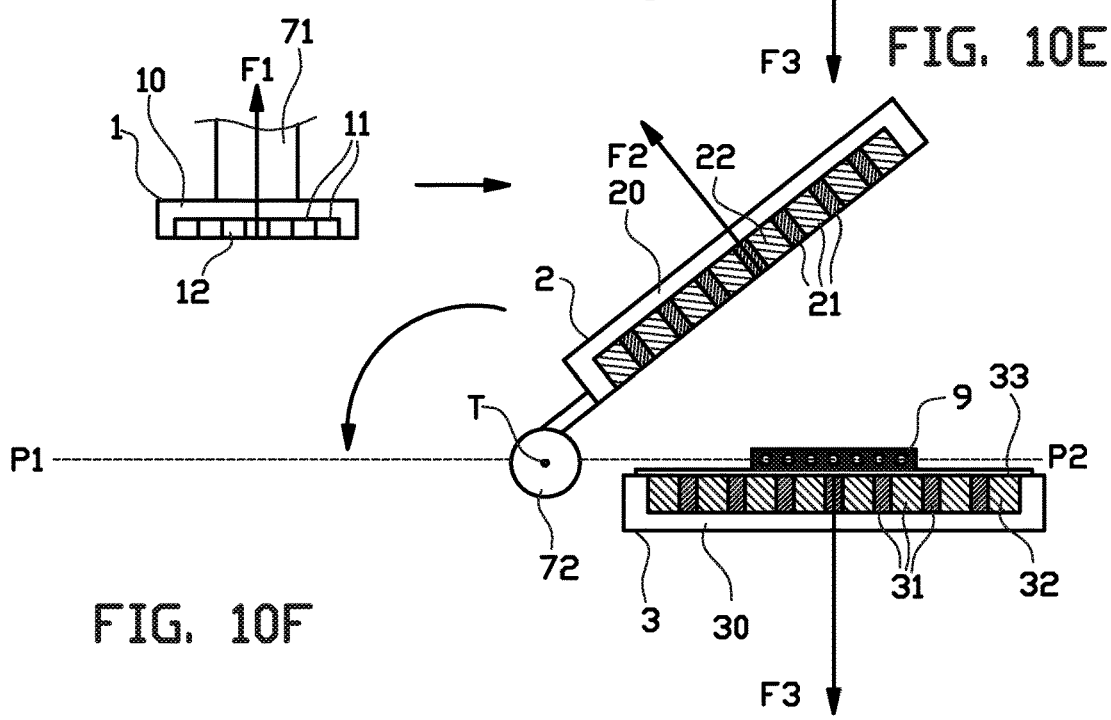

FIG. 10F shows the situation in which the second transfer member 2 is moved from the second transfer state through the post-transfer state away from the third transfer member 3, leaving the tire component 9 at the endless belt of the belt conveyor 33 at said third transfer member 3.

Figure 10G:
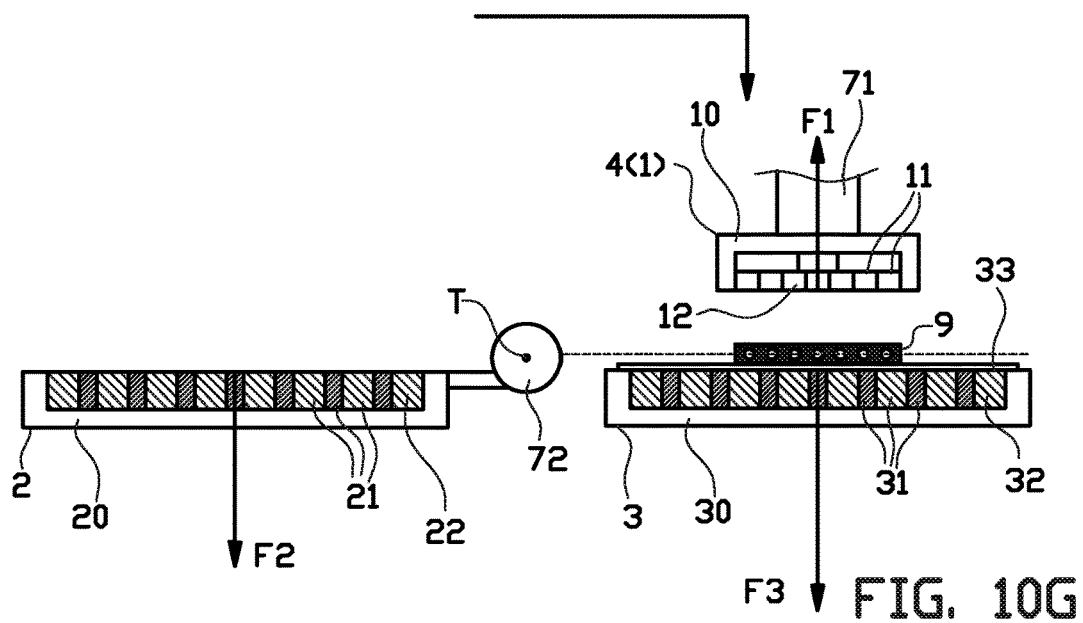
Figure 10H:
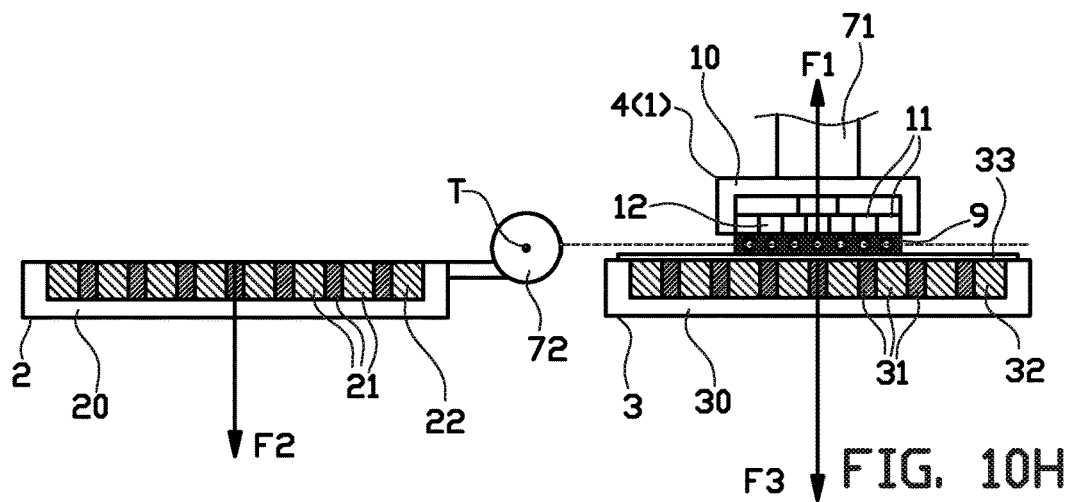
Figure 10I:
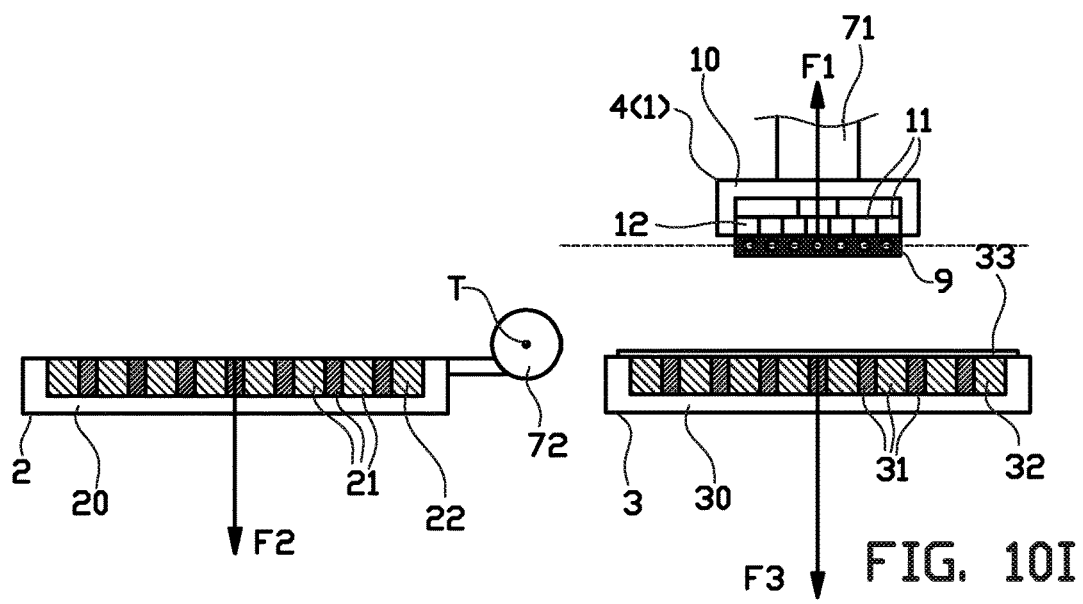

FIGS. 10F and 10G show how a fourth transfer member 4, which in this example is in fact the first transfer member 1, is arranged for picking up the turned-over tire component 9 from the endless belt of the belt conveyor 33 at the third transfer member 3. FIGS. 10G, 10H and 10I essentially correspond to FIGS. 10A, 10B and 10C, respectively, yet at the second transfer plane P2 and with the transfer of the tire component 9 occurring between the third transfer member 3 and the fourth transfer member 4.

In the second transfer state the third magnetic field array 32 is at least partially offset with respect to the second magnetic field array 22. In this exemplary embodiment, the offset between the third magnetic field array 32 and the second magnetic field array 22 is a rotational offset of the third magnetic field array 32 with respect to the second magnetic field array 22 over a second offset angle A2 about a second offset axis R2 that extends normal and/or perpendicular to the second transfer plane P2. Again, the offset may be a misalignment or shift of the third magnetic field sources 31 with respect to the second magnetic field sources 21, e.g. by rotation, translation or change in pitch distance.

Figure 11:
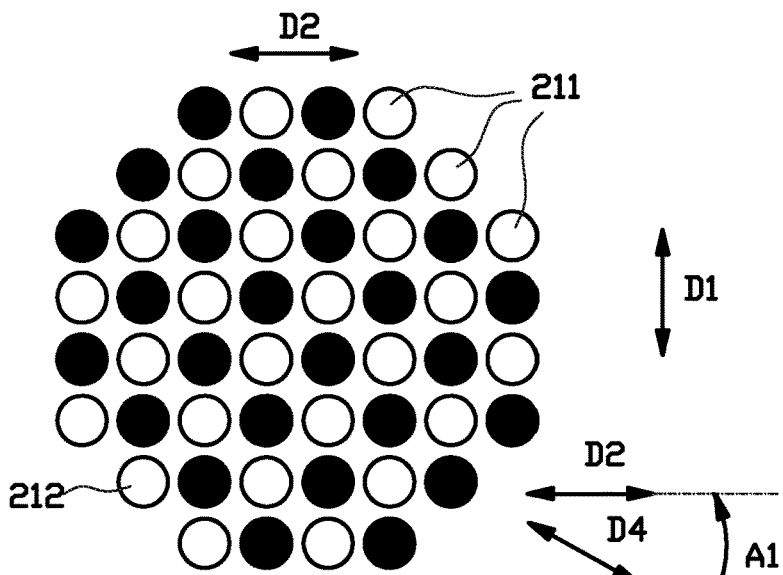
FIGS. 11, 12 and 13 show a possible configuration of the first transfer member, the second transfer member and the third transfer member, respectively, during the steps of the method in FIGS. 10A-10I.
Figure 12:
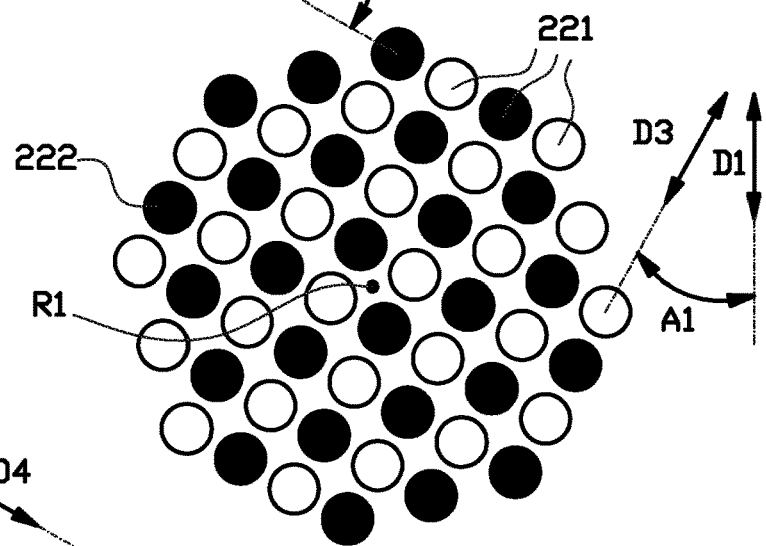
Figure 13:
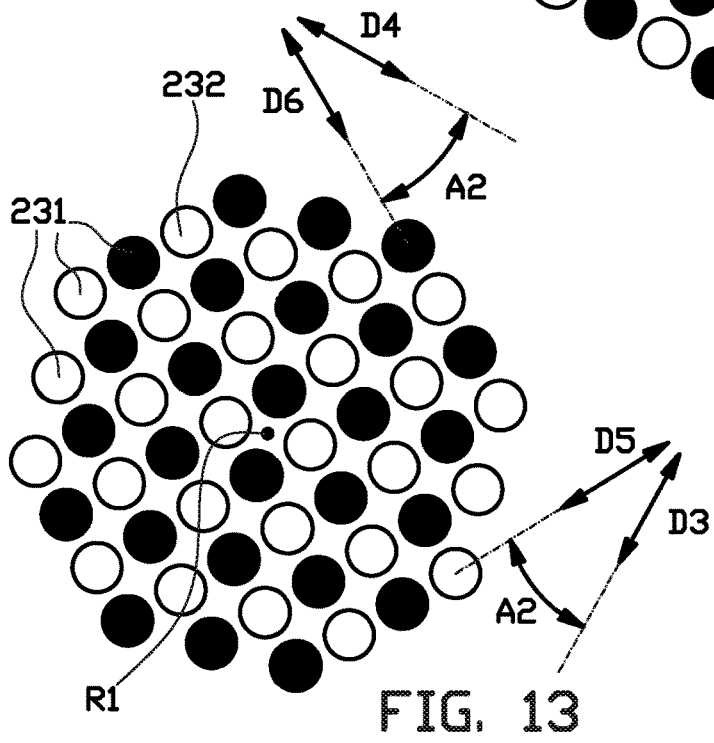

FIGS. 11, 12 and 13 show three possible configurations for the first magnetic field array 212, the second magnetic field array 222 and the third magnetic field array 232. As shown in FIG. 11, the first magnetic field sources 211 are arranged in mutually parallel rows and columns extending in a first pattern direction D1 and a second pattern direction D2, respectively. As shown in FIG. 12, the second magnetic field sources 221 are arranged in mutually parallel rows and columns extending in a third pattern direction D3 and a fourth pattern direction D4, respectively, which are offset with respect to the first pattern direction D1 and the second pattern direction D2, respectively, over a first offset angle A1 about the first offset axis R1. As shown in FIG. 13, the third magnetic field sources 231 are arranged in mutually parallel rows and columns extending in a fifth pattern direction D5 and a sixth pattern direction D6, respectively, which are offset with respect to the first pattern direction D1 and the second pattern direction D2, respectively, over a second offset angle A2 about a second offset axis R2.

The first offset angle A1 and the second offset angle A2 are preferably equal. In this exemplary embodiment, the first offset angle A1 and the second offset angle A2 are both approximately thirty (30) degrees. The offset angles A1, A2 are preferably chosen so that each magnet array 212, 222, 232 is misaligned with respect to other magnet arrays 212, 222, 232 that are used in the same transfer device. Hence, every transfer member 1, 2, 3 has a different magnet array 212, 222, 232. This provides more flexibility, as the first transfer member 1 may also cooperate with the third transfer member 3 instead of the second transfer member 2. Preferably, the offset angles A1, A2 are chosen to be equal or substantially equal to ninety (90) degrees divided by the number of transfer members 1, 2, 3 in the transfer device. The offset angles A1, A2 should not be less than ten (10) degrees to maintain a sufficient decrease in the magnetic attraction between the transfer members 1, 2, 3. Consequently, it would be possible to provide a series of up to eight transfer members (not shown), each with a magnet array that is offset over an angle of at least ten degrees (10) with respect to each of the other magnet arrays.

Within said series, consecutive or successive pairs of transfer members are arranged for transferring the tire component 9 at respective transfer planes. Each consecutive or successive pair of transfer members comprises a receiving transfer member that receives the tire component 9 and a delivering transfer member that delivers the tire component 9 to the receiving transfer member. The magnetic attraction force of the receiving transfer member is larger than the magnetic attraction of the delivering transfer member at the respective transfer plane to transfer the tire component 9 from the delivering transfer member to the receiving transfer member.

The previously discussed magnets 11, 21, 31, 121, 211, 221, 231 are preferably permanent magnets. The construction of the transfer members 1, 2, 3, 102 can thus be kept relatively simple yet very effective. There are exceptions however, where a slightly more complex magnet configuration for at least one of the transfer members is desirable.

Figure 14A:
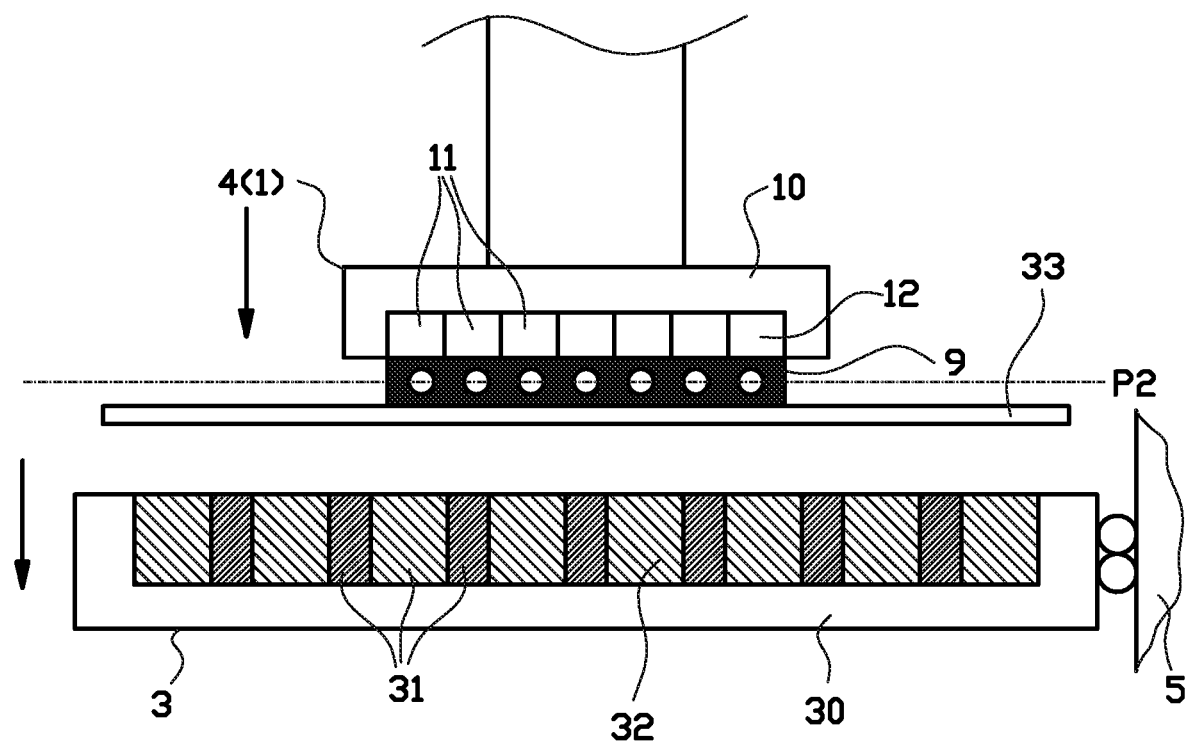
FIGS. 14A and 14B show the first transfer member and the second transfer member during the steps of an alternative method for releasing the tire component.
Figure 14B:
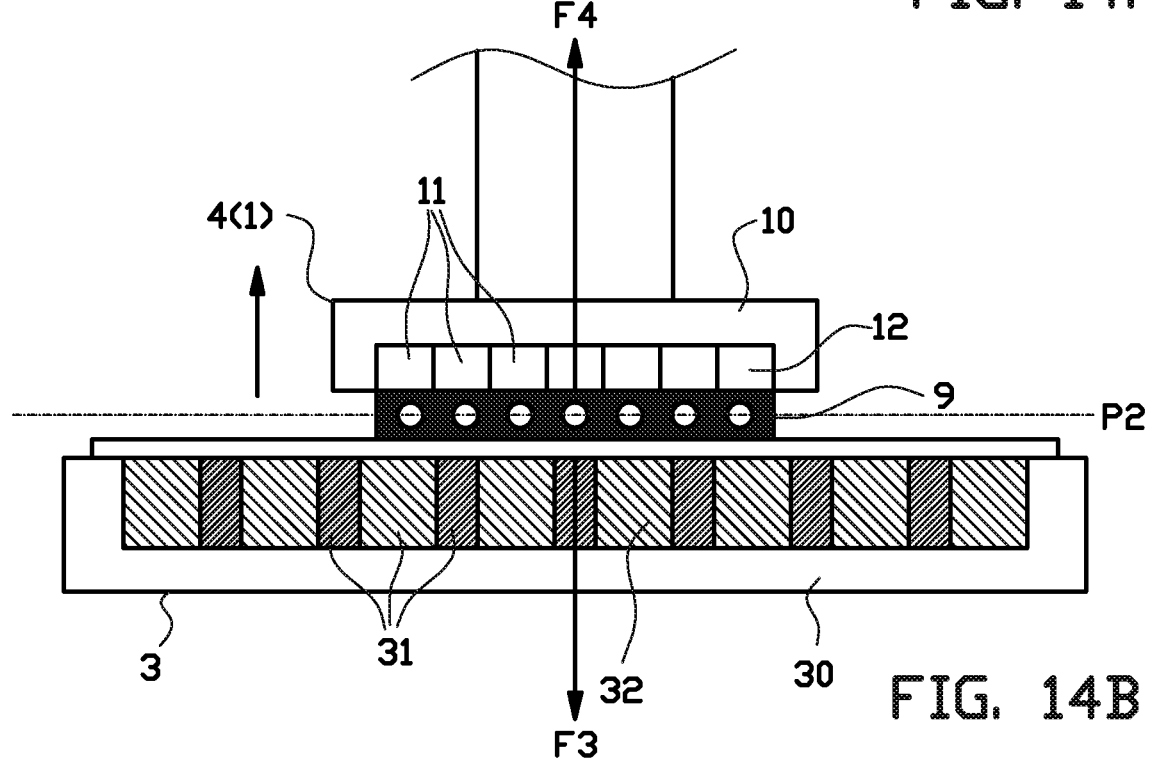

For example, the last transfer member in the series—in FIGS. 10G, 10H and 10I the fourth transfer member 4—may also be formed by the first transfer member 1 of the same series. However, as the magnetic attraction forces F1, F2, F3 have become incrementally stronger with each transfer, the second to last magnetic attraction force F3 is considerably larger than the last magnetic attraction force F1 generated by the first transfer member 1 of the series. Hence, it will be difficult to transfer the tire component 9 between the second to last transfer member 3 and the last transfer member 4 in the form of the first transfer member 1. It has been found however that when one of the magnetic attraction forces is adjustable, e.g. by providing an adjustable electromagnet or by mechanically adjusting the spacing between the magnets and the tire component 9, the magnetic attraction force can be controlled to a level that allows for the transfer of the tire component 9. In the example as shown in FIG. 1, the third transfer member 3 may be lowered with a release mechanism 5, as shown in FIG. 14A, to increase the spacing between tire component 9 supported at the endless belt of the belt conveyor 33 and the magnets 31 of the third transfer member 3, thereby release the third transfer member 3 to the first transfer member 1. Alternatively, the first transfer member 1 may be provided with one or more electromagnets with a capacity sufficient to provide a fourth magnetic attraction force F4, as shown in FIG. 14B, that exceeds the third magnetic attraction force F3.

In an alternative embodiment, the transfer members may be provided with magnet arrays in which the magnets are arranged in random patterns (not shown), wherein the random pattern is different for each transfer member. Although probably not as effective as the predetermined patterns as previously discussed, the random pattern could provide sufficient misalignment to at least partially reduce the magnetic attraction between the respective transfer members.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

In summary, the invention relates to a transfer device and method for transferring an at least partially ferromagnetic tire component (9), wherein transfer device comprises a first transfer member (1) and a second transfer member (2) which are movable into a first transfer state on opposite sides of a first transfer plane (P1), wherein the first transfer member (1) comprises first magnetic field sources (11) that form a first magnetic field array (12) for retaining the tire component (9) with a first magnetic attraction force (F1), wherein the second transfer member (2) comprises second magnetic field sources (21) that form a second magnetic field array (22) for retaining the tire component (9) with a second magnetic attraction force (F2) that is larger than the first magnetic attraction force (F1) at the first transfer plane (P1), wherein in the first transfer state the second magnetic field array (22) is offset with respect to the first magnetic field array (12).

The invention claimed is:

1. A transfer device for transferring an at least partially ferromagnetic tire component, wherein the transfer device comprises a first transfer member and a second transfer member which are movable relative to each other into a first transfer state on opposite sides of a first transfer plane (P1), wherein the first transfer member comprises a plurality of first magnetic field sources that form a first magnetic field array for retaining the tire component to the first transfer member with a first magnetic attraction force (F1), wherein the second transfer member comprises a plurality of second magnetic field sources that form a second magnetic field array for retaining the tire component to the second transfer member with a second magnetic attraction force (F2), wherein in the first transfer state the second magnetic attraction force (F2) at the first transfer plane (P1) is larger than the first magnetic attraction force (F1) at the first transfer plane (P1) to transfer the tire component from the first transfer member to the second transfer member, wherein in the first transfer state the second magnetic field array is at least partially offset with respect to the first magnetic field array.

2. The transfer device according to claim 1, wherein the first transfer member and the second transfer member are movable relative to each other from a pre-transfer state in which the first transfer member and the second transfer member are spaced apart from each other on opposite sides of the first transfer plane (P1) at a first mutual distance (Z1) to the first transfer state in which the first transfer member and the second transfer member are spaced apart from each other on opposite sides of the first transfer plane (P1) at a second mutual distance (Z2) that is smaller than the first mutual distance (Z1), and from the first transfer state into a post-transfer state in which the first transfer member and the second transfer member are spaced apart from each other on opposite sides of the first transfer plane (P1) at a third mutual distance (Z3) that is larger than the second mutual distance (Z2), wherein the second magnetic field array is at least partially offset with respect to the first magnetic field array in the pre-transfer state, the first transfer state, the post-transfer state and therein between.

3. The transfer device according to claim 2, wherein the first mutual distance (Z1) and the third mutual distance (Z3) are at least five millimeters or at least ten millimeters.

4. The transfer device according to claim 2, wherein the transfer device further comprises at least one drive member for driving the relative movement of the first transfer member and the second transfer member between the pre-transfer state, the first transfer state and the post-transfer state.

5. The transfer device according to claim 4, wherein the transfer device further comprises a control unit that is arranged for controlling the at least one drive member for driving the relative movement of the first transfer member and the second transfer member between the pre-transfer state, the first transfer state and the post-transfer state.

6. The transfer device according to claim 1, wherein in the first transfer state the second magnetic field array is offset with respect to the first magnetic field array over a first offset angle (A1) about a first offset axis (R1) normal to the first transfer plane (P1).

7. The transfer device according to claim 6, wherein the first offset angle (A1) is chosen within a range of ten to eighty degrees, within a range of twenty to seventy degrees or within a range of thirty to sixty degrees.

8. The transfer device according to claim 1, wherein the first magnetic field sources are arranged in the first magnetic field array in one or more rows parallel to a first pattern direction (D1).

9. The transfer device according to claim 8, wherein the first magnetic field sources are arranged in the first magnetic field array in one or more columns parallel to a second pattern direction (D2) transverse or perpendicular to the first pattern direction (D1).

10. The transfer device according to claim 9, wherein the first magnetic field sources in each column of the first magnetic field array are evenly distributed in the second pattern direction (D2) at a second pitch distance (X2).

11. The transfer device according to claim 8, wherein the second magnetic field sources are arranged in the second magnetic field array in one or more rows parallel to a third pattern direction (D3).

12. The transfer device according to claim 11, wherein the second magnetic field sources are arranged in the second magnetic field array in one or more columns parallel to a fourth pattern direction (D4) transverse or perpendicular to the third pattern direction (D3).

13. The transfer device according to claim 12, wherein the second pattern direction (D2) is different from the fourth pattern direction (D4).

14. The transfer device according, to claim 12, wherein the second magnetic field sources in each column of the second magnetic field array are evenly distributed in the fourth pattern direction (D4) at a fourth pitch distance (X4).

15. The transfer device according to claim 14, wherein the first magnetic field sources in each column of the first magnetic field array are evenly distributed in the second pattern direction (D2) at a second pitch distance (X2), wherein the second pitch distance (X2) and the fourth pitch distance (X4) are unequal.

16. The transfer device according to claim 11, wherein the first pattern direction (D1) is different from the third pattern direction (D3).

17. The transfer device according to claim 11, wherein the second magnetic field sources in each row of the second magnetic field array are evenly distributed in the third pattern direction (D3) at a third pitch distance (X3).

18. The transfer device according to claim 17, wherein the first magnetic field sources in each row of the first magnetic field array are evenly distributed in the first pattern direction (D1) at a first pitch distance (X1), wherein the first pitch distance (X1) and the third pitch distance (X3) are unequal.

19. The transfer device according to claim 8, wherein the first magnetic field sources in each row of the first magnetic field array are evenly distributed in the first pattern direction (D1) at a first pitch distance (X1).

20. The transfer device according to claim 1, wherein the first magnetic field sources are arranged in the first magnetic field array according to a first random pattern.

21. The transfer device according to claim 20, wherein the second magnetic field sources are arranged in the second magnetic field array according to a second random pattern different from the first random pattern.

22. The transfer device according to claim 1, wherein the plurality of first magnetic field sources comprises a first group of magnets that face towards the first transfer plane (P1) with a north magnetic polarity (N) and a second group of magnets that face towards the first transfer plane (P1) with a south magnetic polarity (S).

23. The transfer device according to claim 22, wherein the plurality of second magnetic field sources comprises a first group of magnets that face towards the first transfer plane (P1) with a north magnetic polarity (N) and a second group of magnets that face towards the first transfer plane (P1) with a south magnetic polarity (S).

24. The transfer device according to claim 22, wherein the magnets of the first group alternate with the magnets of the second group within a respective one of the magnetic field arrays.

25. The transfer device according to claim 1, wherein the first magnetic field sources, the second magnetic field sources or both are permanent magnets.

26. The transfer device according to claim 1, further comprising a third transfer member, wherein the second transfer member and the third transfer member are movable relative to each other into a second transfer state on opposite sides of a second transfer plane (P2), wherein the third transfer member comprises a plurality of third magnetic field sources that form a third magnetic field array for retaining the tire component to the third transfer member with a third magnetic attraction force (F3), wherein in the second transfer state the third magnetic attraction force (F3) at the second transfer plane (P2) is larger than the second magnetic attraction force (F2) at the second transfer plane (P2) to transfer the tire component from the second transfer member to the third transfer member, wherein in the second transfer state the third magnetic field array is at least partially offset with respect to the second magnetic field array.

27. The transfer device according to claim 26, wherein in the second transfer state the third magnetic field array is offset with respect to the second magnetic field array over a second offset angle (A2) about a second offset axis (R2) normal to the second transfer plane (P2).

28. The transfer device according to claim 27, wherein the second offset angle (A2) is chosen within a range of ten to eighty degrees, within a range of twenty to seventy degrees or within a range of thirty to sixty degrees.

29. The transfer device according to claim 26, wherein the transfer device further comprises a fourth transfer member or further transfer members that together with the first transfer member, the second transfer member and the third transfer member forms a series of transfer members for consecutively transferring the tire component between successive or consecutive pairs of a delivering transfer member and a receiving transfer member within the series at respective transfer planes (P1; P2), wherein each one of the fourth transfer member or the further transfer members comprises a plurality of further magnets that form a further magnetic field array for retaining the tire component to a respective one of the fourth transfer member or the further transfer members with a further magnetic attraction force, wherein for each successive or consecutive pair of transfer members the magnetic attraction force of the receiving transfer member is larger than the magnetic attraction force of the delivering transfer member at the respective transfer plane (P1, P2) to transfer the tire component from the delivering transfer member to the receiving transfer member, wherein for each successive or consecutive pair of transfer members the magnetic field array of the receiving transfer member is at least partially offset with respect to the magnetic field array of the delivering transfer member.

30. The transfer device according to claim 29, wherein for each pair the magnetic field array of each receiving transfer member is offset with respect to the magnetic field array of the delivering member over an offset angle (A1, A2) about a respective offset axis (R1, R2) normal to the respective transfer plane (P1, P2).

31. The transfer device according to claim 30, wherein the offset angle (A1, A2) for each pair is at least ten degrees or at least fifteen degrees.

32. The transfer device according to claim 30, wherein the offset angle (A1, A2) for each pair is equal to ninety degrees divided by the number of transfer members within the series.

33. The transfer device according to claim 29, wherein the last transfer member in the series of transfer members is the first transfer member of the same series of transfer members.

34. The transfer device according to claim 1, wherein the magnetic attraction force (F1-F3) of one of the magnetic field arrays is adjustable.

35. The transfer device according to claim 1, wherein one of the transfer members comprises a transfer body and a release mechanism that is arranged for moving the respective magnetic field array with respect to said transfer body away from the transfer plane (P1, P2).

36. The method for transferring an at least partially ferromagnetic tire component with the use of a transfer device according to claim 1, wherein the method comprises the steps of:
retaining the tire component to the first transfer member with the first magnetic attraction force (F1);
moving the first transfer member and the second transfer member relative to each other into the first transfer state on opposite sides of the first transfer plane (P1);
retaining the tire component to the second transfer member with the second magnetic attraction force (F2), wherein in the first transfer state the second magnetic attraction force (F2) at the first transfer plane (P1) is larger than the first magnetic attraction force (F1) at the first transfer plane (F1); and transferring the tire component from the first transfer member to the second transfer member,
wherein in the first transfer state the second magnetic field array is at least partially offset with respect to the first magnetic field array.

37. The method according to claim 36, wherein the method further comprises the steps of:
moving the first transfer member and the second transfer member relative to each other from a pre-transfer state in which the first transfer member and the second transfer member are spaced apart from each other on opposite sides of the first transfer plane (F1) at a first mutual distance (Z1);
moving the first transfer member and the second transfer member relative to each other from the pre-transfer state into the first transfer state in which the first transfer member and the second transfer member are spaced apart from each other on opposite sides of the first transfer plane (P1) at a second mutual distance (Z2) that is smaller than the first mutual distance (Z1); and
moving the first transfer member and the second transfer member relative to each other from the first transfer state into a post-transfer state in which the first transfer member and the second transfer member are spaced apart from each other on opposite sides of the first transfer plane (P1) at a third mutual distance (Z3) that is larger than the second mutual distance (Z2),
wherein the second magnetic field array is at least partially offset with respect to the first magnetic field array in the pre-transfer state, the first transfer state, the post-transfer state and therein between.

* * * * *